July 5, 1932.   H. C. ROHLFS   1,866,372
CELLULOSE RESIN PRODUCT AND METHOD OF ITS PREPARATION
Filed Feb. 9, 1928

Inventor:
Harry C. Rohlfs,
by Charles E. Mullen
His Attorney.

Patented July 5, 1932

1,866,372

UNITED STATES PATENT OFFICE

HARRY CLAYTON ROHLFS, OF SCHENECTADY, NEW YORK, ASSIGNOR TO GENERAL ELECTRIC COMPANY, A CORPORATION OF NEW YORK

CELLULOSE RESIN PRODUCT AND METHOD OF ITS PREPARATION

Application filed February 9, 1928. Serial No. 253,181.

The present invention relates to the manufacture of material from cellulose products, such as paper, cotton, linen, or the like, cemented together with a binder comprising a resin made by the condensation of a polyhydric alcohol and a polybasic acid, and which will be termed herein as an alkyd resin.

It has been found heretofore that when cellulose products are brought into contact with an alkyd resin, as for example the resin made by the interaction of glycerol and phthalic anhydride, that a chemical reaction occurred which weakened the cellulose product and in some cases produced an unstable compound. For example, when cotton fibers have been impregnated with such alkyd resin and subjected to heat and pressure, violent explosions have occurred. Similarly, when sheets of paper have been cemented together with an alkyd resin serious difficulties have been encountered in the coating step and serious deterioration and weakening of this cellulose product has occurred during the subsequent pressing operation when the material has been subjected to heat to convert the resin to the infusible state. These difficulties have heretofore prevented the utilization of the advantageous properties of alkyd resins in the manufacture of laminated materials from cellulose products.

Alkyd resins are known to assume a soluble, fusible condition, also called the A or sol-stage, and upon further heating to become insoluble and infusible, known as the C or gel-stage. An intermediate condition, identified as the B-stage, is not so definite as the A and C-stages, but is a transition stage in which the resin absorbs solvent and swells without going into solution and softens to a jelly-like form without fusion. In this softened state the resin is tacky, that is, masses of softened B-stage resin readily stick together.

In accordance with my invention cellulose materials are cemented together to form strong, coherent products by converting the alkyd resin to the B-stage, then comminuting the resin, applying it in a comminuted state to the surface of the cellulose material and subsequently heating the coated material to a temperature at which the alkyd resin is converted to the C-stage.

Figure 1:
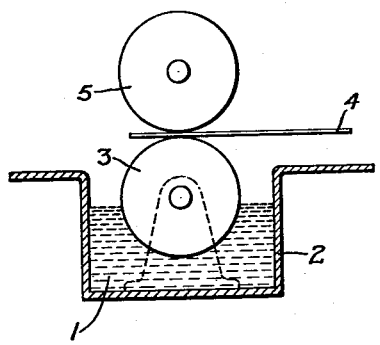
Figure 2:
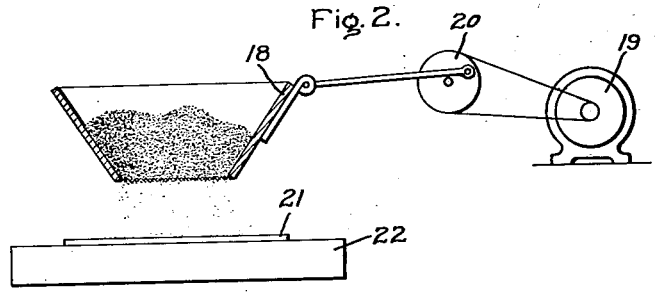
Figure 3:
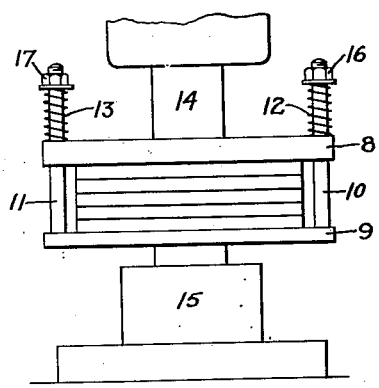
Figure 4:
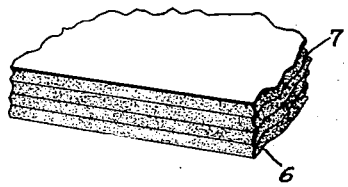

The novel features of my invention will be pointed out with greater particularity in the appended claims. For a more complete understanding of my invention reference may be had to the following description taken in connection with the accompanying drawing in which Fig. 1 shows somewhat diagrammatically a sectional view of a coating apparatus comprising a pair of coacting rolls whereby the alkyd resin is applied as a suspension; Fig. 2 shows partly in section and also diagrammatically a different form of coating apparatus whereby the alkyd resin is applied as a dry powder; Fig. 3 shows in outline a press suitable for holding a product embodying my invention under pressure during manufacture; and Fig. 4 shows enlarged and partly in section a product embodying my invention.

In carrying out my invention, an alkyd resin in the B-stage, such as the resin made from glycerol and phthalic anhydride, is prepared by heating the reacting ingredients in a suitable container, such as an aluminum kettle to a temperature at which reaction occurs accompanied by the evolution of water vapor until finally the resulting resin becomes infusible and puffs up into a cellular mass. In this condition the alkyd resin is soft and tacky when heated to about 125° C. The particular temperature at which this conversion occurs varies with the rate of heating, with the quantities involved, and other variables. In general it may be said that the resin derived by the reaction between glycerine and phthalic anhydride is converted to the B-stage upon heating for about 2½ hours at a temperature of about 220° C.

Upon cooling, this B-resin becomes hard and brittle and can be comminuted by grinding or by impact. The powdered resin is preferably subdivided to a fineness such that it can be passed through a sieve of about 150 meshes per square inch, and is distributed as a thin layer upon the surface of the sheet material to be cemented together. For example, the ground resin may be suspended in a liquid, such as acetone, furfural, glycol diacetate, turpentine or a mixture of volatile solvents such as a mixture of alcohol, benzol and acetone. It may be applied by brushing, spraying or as shown in Fig. 1 by means of rolls. The comminuted resin suspended in a liquid 1 is contained in a receptacle 2. A rotatable roll 3 is supported in contact with the liquid 1. The sheet material 4 picks up the resin from the roll 3 against which it is pressed by a rotating roll 5. The coated sheet material is air dried and preferably is subjected for a short time to a temperature of about 30° C. which causes the particles of resin to adhere to the paper, or other sheet material, and to each other. A sufficient number of sheets are then superimposed to form a laminated product of a desired thickness, as shown in Fig. 4. The assembled sheets 6 with interposed layers 7 of resin are subjected to heat and to pressure to produce consolidation accompanied by thorough incorporation of the resin with the surface of the superimposed sheets. As shown in Fig. 3 the superimposed sheets preferably are clamped between plates 8, 9 perforated with bolts or studs 10, 11 provided with heavy springs 12, 13 whereby continuous pressure may be maintained. Pressure first may be applied by the ram 14 of a press acting against a base 15. The nuts 16, 17 then are screwed down and the product thus held under pressure is introduced into an oven to be cured.

For example, good results are obtained by subjecting the superimposed sheets to a temperature of 125 to 140° C. and to a pressure of 1,000 lbs. per square inch, for about 14 to 16 hours. The product thus obtained is dense and homogeneous, the individual layers of paper, or the like, and the resin not being discernible to the unaided eye. No appreciable deterioration of the cellulose fibers occurs, the resin being largely polymerized before application upon the sheet material, and as it is in contact only with the surface layer of the sheet material, it does not interact to any appreciable extent with the cellulose.

The resin need not be applied as a suspension in a liquid. In Fig. 2 is illustrated a device for applying the resin as a dry powder from a sieve 18 which is vibrated by a motor 19 acting on a reciprocating mechanism 20. The sheet material 21 may rest on a base 22 or may be caused to travel linearly under the shaking device by suitable rolls as in Fig. 1 or otherwise.

The products made according to my invention are stronger and less brittle than products made by the use of natural gums or resins or with phenolic condensation products as cementing agents. They do not delaminate when subjected to solvents, such as alcohol, gasolene, benzol or linseed oil, for long periods of time and can be subjected to high temperatures without deterioration providing such temperatures do not exceed the temperatures which the constituent cellulose product is capable of withstanding without decomposition.

What I claim as new and desire to secure by Letters Patent of the United States is:—

1. The method of cementing together a cellulose material which consists in surface coating said material with an alkyd resin in the B-stage superimposing material thus coated and subjecting the same to pressure at a temperature sufficiently high to produce a coherent, unitary structure.

2. The method of cementing layers of paper to one another to form a composite cardboard which consists in surface coating the individual layers with a polyhydric alcohol-polybasic acid resin which has been polymerized sufficiently to be non-fusible while still being softened when heated to a temperature of about 125° C., superimposing the layers of paper thus coated and subjecting the same to pressure at a temperature of 125 to 140° C.

3. The method of cementing together sheets of a cellulose composition which consists in coating said sheets with a powdered glycerol phthalate resin which has been polymerized sufficiently to be no longer fusible but which softens when heated to a temperature to which said sheets can be heated for a short time without substantial deterioration, superimposing the sheets thus coated upon one another and subjecting the assembled sheets to a temperature sufficiently high to soften said resin for a length of time insufficient to materially effect the character of said sheet material.

4. The method of cementing together layers of paper to form a composite cardboard which consists in coating said layers with a powdered glycerol phthalate resin which softens at a temperature of 125° C. without becoming liquified, superimposing the layers upon one another and heating to a pressure of at least about 1,000 lbs. per square inch at a temperature of about 140° C.

5. A product comprising cellulose fibers united into coherent form by an alkyd resin in the infusible, insoluble state, said resin being in contact with surface layers of said fibers without substantially permeating the same.

6. A cardboard comprising superimposed sheets of paper cemented together with a condensation product of glycerine and phthalic anhydride which engages with the surface layers only of said paper sheets.

In witness whereof, I have hereunto set my hand this 7th day of February, 1928.

HARRY CLAYTON ROHLFS.